US012231766B2

(12) United States Patent
Min et al.

(10) Patent No.: US 12,231,766 B2
(45) Date of Patent: *Feb. 18, 2025

(54) METHOD AND SYSTEM WITH OPTIMIZATION OF LENS MODULE ASSEMBLY

(71) Applicants: SAMSUNG ELECTRO-MECHANICS CO., LTD., Suwon-si (KR); KYONGGI UNIVERSITY INDUSTRY & ACADEMIA COOPERATION FOUNDATION, Suwon-si (KR)

(72) Inventors: Hye Geun Min, Suwon-si (KR); Ye Rim Choi, Seoul (KR); Yeon Bin Son, Siheung-si (KR); Sung Hoon Kim, Gwacheon-si (KR); Eun Young Choi, Anyang-si (KR)

(73) Assignees: Samsung Electro-Mechanics Co., Ltd., Suwon-si (KR); KYONGGI UNIVERSITY INDUSTRY & ACADEMIA COOPERATION FOUNDATION, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,912

(22) Filed: Jan. 16, 2024

(65) Prior Publication Data
US 2024/0155225 A1 May 9, 2024

Related U.S. Application Data

(63) Continuation of application No. 17/397,136, filed on Aug. 9, 2021, now Pat. No. 11,910,083.

(30) Foreign Application Priority Data

Nov. 6, 2020 (KR) .................. 10-2020-0147445
Feb. 22, 2021 (KR) .................. 10-2021-0023177

(51) Int. Cl.
H04N 5/335 (2011.01)
G06N 3/126 (2023.01)
(Continued)

(52) U.S. Cl.
CPC ............. H04N 23/64 (2023.01); G06N 3/126 (2013.01); H04N 23/617 (2023.01)

(58) Field of Classification Search
CPC ..................................... G06N 3/126
See application file for complete search history.

(56) References Cited

U.S. PATENT DOCUMENTS 11,460,713 B2    10/2022   Au et al.
11,910,083 B2*   2/2024    Min ............ G06N 3/044
(Continued)

FOREIGN PATENT DOCUMENTS

KR    10-2011-0108714 A    10/2011
KR    10-2013-0024813 A    3/2013
(Continued)

OTHER PUBLICATIONS

U.S. Appl. No. 17/397,136, filed Aug. 9, 2021, Hye Geun Min, et al.

Primary Examiner — Gary C Vieaux
(74) Attorney, Agent, or Firm — NSIP Law

(57) ABSTRACT

A lens module assembly optimization method includes: in preparing a lens module including assembled N lenses respectively formed in cavities: receiving characteristic information of at least N lenses respectively formed in N cavity groups each including a respective plurality of cavities; and processing information for selecting N cavities from the N cavity groups, based on the characteristic information. A past cavity selection result, a fitness function configured based on data of the assembled N lenses or data of the prepared lens module according to the past cavity (Continued)

selection result, and a genetic algorithm are received or stored. The processing of the information includes updating chromosome entity information based on the fitness function and output chromosome information crossed or mutated based on the genetic algorithm from input chromosome information corresponding to the past cavity selection result, and processing the information based on the chromosome entity information and the characteristic information.

20 Claims, 9 Drawing Sheets

(51) Int. Cl.
*H04N 23/60* (2023.01)
*H04N 23/617* (2023.01)

(56) References Cited

U.S. PATENT DOCUMENTS

| | | |
|---|---|---|
| 2004/0232237 A1 | 11/2004 | Kasai et al. |
| 2012/0242989 A1 | 9/2012 | So et al. |
| 2013/0047396 A1 | 2/2013 | Au et al. |
| 2019/0339669 A1 | 11/2019 | Coffman et al. |
| 2020/0285711 A1 | 9/2020 | Zimanyi |

FOREIGN PATENT DOCUMENTS

| | | | |
|---|---|---|---|
| KR | 10-2015-0001422 | A | 1/2015 |
| KR | 10-1512829 | B1 | 4/2015 |
| KR | 10-1538395 | B1 | 7/2015 |
| KR | 10-2019-0010315 | A | 1/2019 |
| KR | 10-2020-0012281 | A | 2/2020 |
| KR | 10-2020-0031939 | A | 3/2020 |
| KR | 10-2123466 | B1 | 6/2020 |

* cited by examiner

METHOD AND SYSTEM WITH OPTIMIZATION OF LENS MODULE ASSEMBLY

CROSS-REFERENCE TO RELATED APPLICATIONS

This application is a continuation of U.S. patent application Ser. No. 17/397,136 filed on Aug. 9, 2021, now U.S. Pat. No. 11,910,083 issued on Feb. 20, 2024, which claims the benefit under 35 U.S.C. § 119 (a) of Korean Patent Application No. 10-2020-0147445 filed on Nov. 6, 2020, and Korean Patent Application No. 10-2021-0023177 filed on Feb. 22, 2021, in the Korean Intellectual Property Office, the entire disclosures of which are incorporated herein by reference for all purposes.

BACKGROUND

1. Field

The following description relates to a method and system for optimization of a lens module assembly.

2. Description of Related Art

Recently, since there is a trend towards installation of high-performance camera modules in smartphones, camera module manufacturers are focusing on maximizing production efficiency of camera modules to respond to a rapid increase in demand therefor using limited factories and facilities. A camera module may include a lens module in which a plurality of lenses are compactly arranged. Mass production of the lens module is gradually becoming difficult, as camera modules are being implemented with high-performance components and features.

Currently, in order to find an assembly condition for mass production of the lens module, field workers may manually select the assembly condition exhibiting high performance, after trying a number of assembly conditions based on knowledge and past experience of the workers. However, the above method has drawbacks in that it may consume a great amount of time and money, and conditions of which the workers are not aware cannot even be attempted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with optimization of a lens module assembly includes, in preparing a lens module including assembled N lenses respectively formed in cavities to overlap each other on an optical axis, wherein N is a natural number of 2 or more: receiving, by a computing system, characteristic information of at least N lenses respectively formed in N cavity groups each including a respective plurality of cavities having a similarity to each other that is higher than a similarity to each other of the assembled N lenses; and processing, by the computing system, information for selecting N cavities from the N cavity groups, based on the characteristic information. The computing system receives or stores a past cavity selection result obtained by the processing of the information for selecting the N cavities, a fitness function configured based on data of the assembled N lenses or data of the prepared lens module according to the past cavity selection result, and a genetic algorithm. The processing of the information for selecting the N cavities includes updating chromosome entity information based on the fitness function and output chromosome information crossed or mutated based on the genetic algorithm from input chromosome information corresponding to the past cavity selection result, and processing the information for selecting the N cavities based on the chromosome entity information and the characteristic information.

Chromosome information used in the genetic algorithm may be composed of a plurality of gene information respectively having N pieces of point information, or the chromosome information used in the genetic algorithm may be composed of N pieces of gene information respectively having a plurality of point information.

The output chromosome information may be generated through either one or both of a point crossover and a gene crossover between a plurality of input chromosome information.

The updating of the chromosome entity information may be performed based on a number of values, greater than or equal to a reference value, among a plurality of values according to a quality prediction model of a plurality of gene information included in the input chromosome information or the output chromosome information.

Each of the N cavity groups may include M cavities, wherein M is a natural number of 2 or more. The updating of the chromosome entity information may be performed based on a number of values, greater than or equal to a reference value, among a plurality of values according to a quality prediction model of an M cavity selection result selected from the N cavity groups.

A plurality of lenses corresponding to the plurality of cavities included in one of the N cavity groups may be formed at the same time.

The characteristic information of the N lens groups may include optical or physical measurement information of the N lens groups.

The fitness function may be repeatedly updated based on data of the assembled N lenses or data of the prepared lens module according to the past cavity selection result.

The method may further include processing, by the computing system, angle information on rotation of at least one of N lenses corresponding to the N cavities in a direction around the optical axis, when the N lenses corresponding to the N cavities are assembled to overlap on the optical axis, based on the information for selecting the N cavities.

The method may further include performing updating of the fitness function based on data of each of the N lenses corresponding to the N cavities selected by the processing of the information for selecting the N cavities, and updating of the fitness function based on data of a lens module assembled at an angle corresponding to the processing of the angle information, according to a machine learning algorithm.

In another general aspect, a non-transitory, computer-readable storage medium stores instructions that, when executed by a processor, cause the processor to perform the method described above.

In another general aspect, a method with optimization of a lens module assembly includes, in preparing a lens module including assembled N lenses respectively formed in cavities to overlap each other on an optical axis, wherein N is a natural number of 2 or more: receiving, by a computing system, characteristic information of at least N lenses respectively formed in N cavity groups each including a respective plurality of cavities having a similarity to each other that is higher than a similarity to each other of the assembled N lenses; processing, by the computing system, information for selecting N cavities from the N cavity groups, based on a fitness function and the characteristic information; and processing, by the computing system, angle information on rotation of at least one of N lenses corresponding to the N cavities in a direction around the optical axis, when the N lenses corresponding to the N cavities are assembled to overlap on the optical axis, based on the information for selecting the N cavities. The computing system receives or stores a past cavity selection result obtained by the processing of the information for selecting the N cavities, and the fitness function configured based on data of the assembled N lenses or data of the prepared lens module according to the past cavity selection result. The computing system performs updating of the fitness function based on data of each of the N lenses corresponding to the N cavities selected by the processing of the information for selecting the N cavities, and updating of the fitness function based on data of a lens module assembled at an angle corresponding to the processing of the angle information, according to a machine learning algorithm.

The processing of the angle information may include processing the angle information by applying the information for selecting the N cavities to a rotation angle prediction model updated based on the data of a lens module assembled at the angle corresponding to the processing of the angle information.

Each of the N cavity groups may include M cavities, wherein M is a natural number of 2 or more. Fitness information output from the fitness function may include information on a number of values, greater than or equal to a reference value, among a plurality of values according to a quality prediction model of an M cavity selection result selected from the N cavity groups.

The plurality of cavities included in one of the N cavity groups may have a higher isotropic property, respectively, than a plurality of lenses corresponding to the one of the N cavity groups.

The plurality of cavities included in one of the N cavity groups may be connected to each other before a plurality of lenses corresponding to the one of the N cavity groups are formed, and may be separated from each other after the plurality of lenses corresponding to the one of the N cavity groups are formed.

In another general aspect, a non-transitory, computer-readable storage medium stores instructions that when executed by a processor, cause the processor to perform the method described above.

In another general aspect, a system with optimization of a lens module assembly includes at least one processor configured to, in preparing a lens module including assembled N lenses respectively formed in cavities to overlap each other on an optical axis, wherein N is a natural number of 2 or more: receive characteristic information of at least N lenses respectively formed in N cavity groups each including a plurality of cavities; and process information for selecting N cavities from the N cavity groups, based on the characteristic information. The system is configured to obtain a past cavity selection result obtained by the processing of the information for selecting the N cavities, a fitness function configured based on data of the assembled N lenses or data of the prepared lens module according to the past cavity selection result, and a genetic algorithm. The at least one processor is further configured to process the information for selecting the N cavities by updating chromosome entity information based on the fitness function and output chromosome information generated by the genetic algorithm from input chromosome information corresponding to the past cavity selection result, and processing the information for selecting the N cavities based on the chromosome entity information and the characteristic information.

The plurality of cavities may have a similarity to each other that is higher than a similarity to each other of the assembled N lenses.

In each of the N cavity groups, a plurality of lenses may be respectively formed in the plurality of cavities at the same time.

Chromosome information used in the genetic algorithm may be composed of a plurality of gene information respectively having N pieces of point information, or the chromosome information used in the genetic algorithm may be composed of N pieces of gene information respectively having a plurality of point information.

The output chromosome information may be generated through either one or both of a point crossover and a gene crossover between a plurality of input chromosome information.

Each of the N cavity groups may include M cavities, wherein M is a natural number of 2 or more. The processor may be further configured to perform the updating of the chromosome entity information based on a number of values, greater than or equal to a reference value, among a plurality of values according to a quality prediction model of an M cavity selection result selected from the N cavity groups.

Other features and aspects will be apparent from the following detailed description, the drawings, and the claims.

Figure 1A:
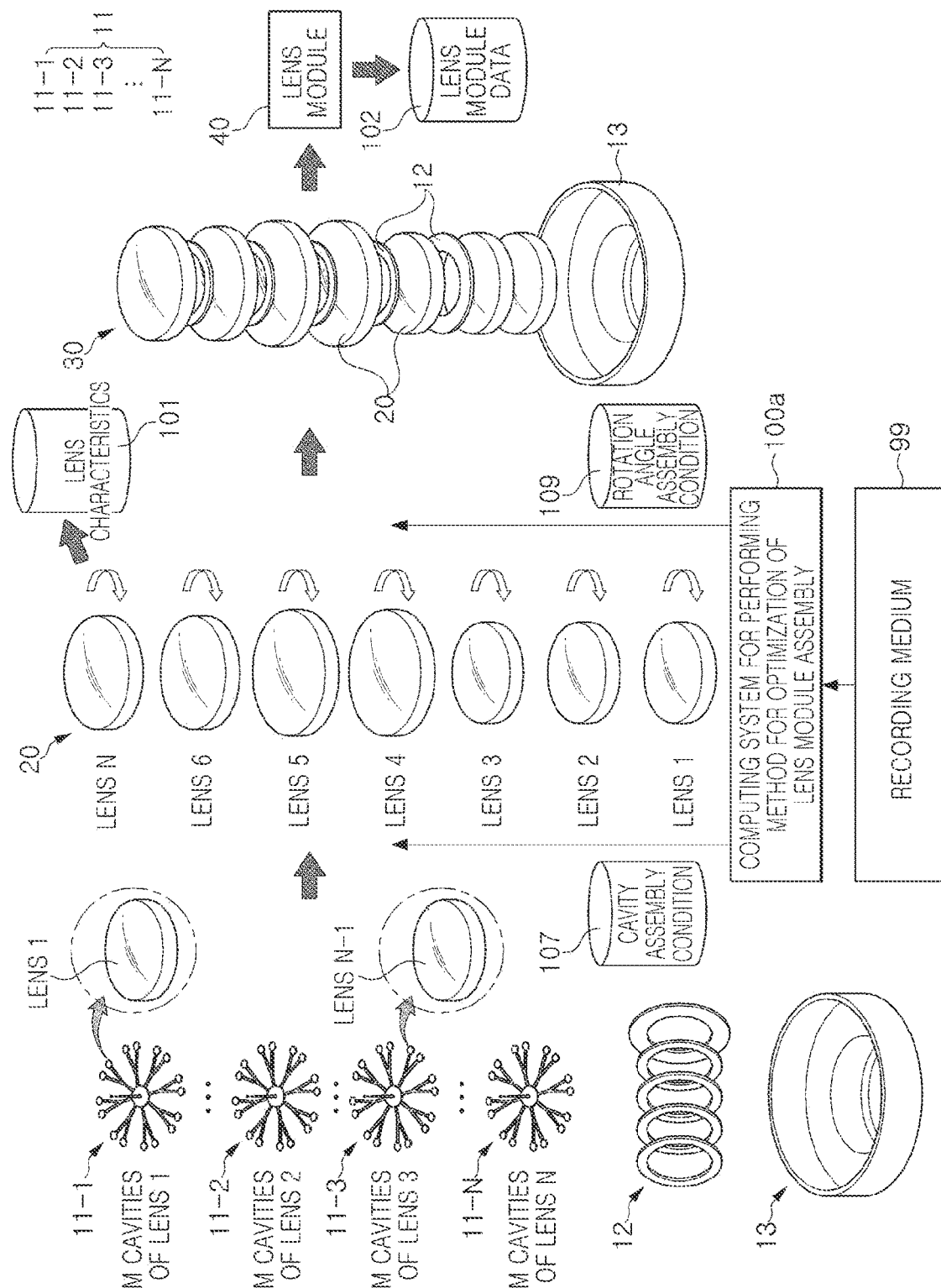
FIG. 1A is a view illustrating a method for optimization of a lens module assembly, according to an embodiment, applied to a lens module assembly process.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Figure 1B:
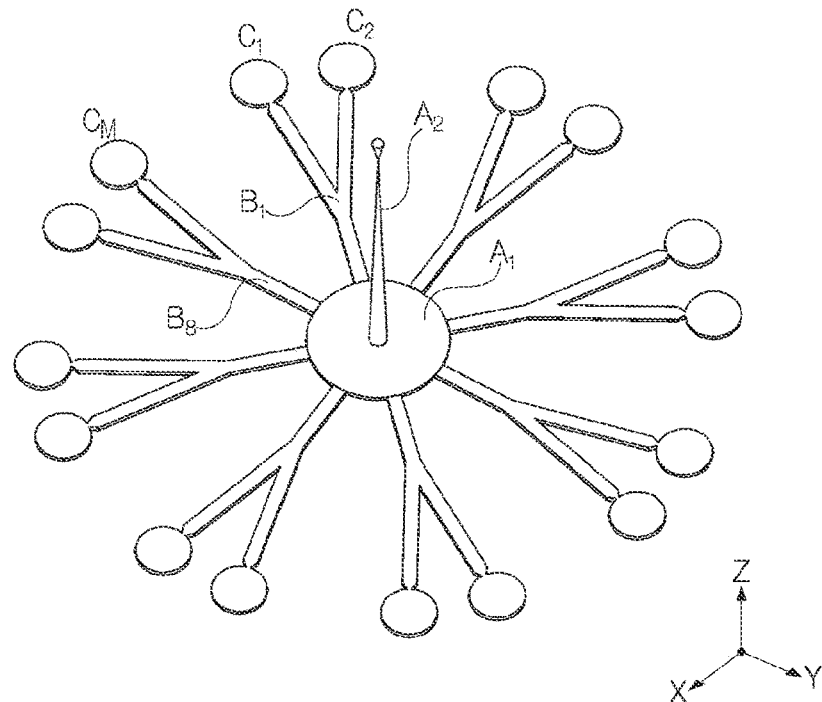
FIG. 1B is a view illustrating a cavity that may be used to form a lens, according to an embodiment.

FIG. 1A is a view illustrating a method for optimization of a lens module assembly, according to an embodiment, applied to a lens module assembly process. FIG. 1B is a view illustrating a cavity that may be used to form a lens.

Referring to FIG. 1A, a lens module 40 may be prepared such that N lenses 20 overlap each other on an optical axis (e.g., in a vertical direction). For example, a combination structure 30 in which the N lenses 20 and spacers 12 are alternately arranged may be assembled in a barrel 13. Although the embodiment of FIG. 1A is shown as including 7 lenses, N is not limited to 7, and is a natural number of 2 or more.

The N lenses 20 may be designed to have different optical parameters or physical parameters (e.g., a diameter, a thickness, a curvature, or the like), and characteristics of the lens module 40 may be provided as varied as the number of combinations of the N lenses 20 having different characteristics.

Each of the N lenses 20 may be formed in a cavity corresponding thereto, among N cavities. For example, each of the N lenses 20 may be produced by an injection molding process, including injecting a transparent or light material (e.g., plastic) in a resin state into the cavity and curing the material in a high temperature atmosphere.

As the number of the N cavities corresponding to the N lenses 20 increases, the number of lens modules 40 prepared during a unit time may increase, and mass productivity of the lens modules 40 may increase.

Therefore, the N cavities corresponding to the N lenses 20 may be composed of N cavity groups 11-1, 11-2, 11-3, . . . , and 11-N, and the N cavity groups 11-1, 11-2, 11-3, . . . , and 11-N may include a plurality of cavities, respectively.

The plurality of cavities of each of the N cavity groups 11-1, 11-2, 11-3, . . . , and 11-N may have similarity to each other that is higher than similarity to each other of the N lenses 20. A plurality of lenses of each of the N lenses 20 may be simultaneously formed in a plurality of cavities corresponding thereto.

Referring to FIG. 1B, a first cavity group 11-1 may include M first cavities $C_1, C_2, \ldots,$ and $C_M$, and the M first cavities $C_1, C_2, \ldots,$ and $C_M$ may be substantially identical to each other. Although the embodiment illustrated in FIG. 1B is shown as including 16 first cavities, M is not limited to 16, and is a natural number of 2 or more. In addition, the number of cavities included in each of the N cavity groups may be 16 and may be the same as each other, but is not limited thereto.

For example, the M first cavities $C_1, C_2, \ldots,$ and $C_M$ may be connected to each other by connecting members B1 and B8, core members A1 and A2 may be connected to the connecting members $B_1$ and $B_8$, and may be configured to allow a structure in a lens assembly process or a person to hold the first cavity group 11-1.

For example, the M first cavities $C_1, C_2, \ldots,$ and $C_M$ included in the first cavity group 11-1 may be connected to each other by the connecting members B1 and B8 before M first lenses are formed, and may be separated from each other after the M first lenses are formed. A portion in each of the M first cavities $C_1, C_2, \ldots,$ and $C_M$, to which the connecting members $B_1$ and $B_8$ are connected, may be used as a reference point for a rotation angle when assembling a lens.

Since characteristics of the N lenses 20 may be dependent on characteristics of cavities corresponding thereto, the cavities may have characteristics dependent on a design of optical parameters or physical parameters of each of the N lenses 20. Since the optical or physical parameters of the N lenses 20 may require high detail, a high correlation between the design of the N lenses 20 and the characteristics of the respective cavities may be required. Various variables (e.g., lens molding clamping force, resin filling time, a temperature, a cooling rate, or the like) in generating the N lenses 20 in the cavities corresponding thereto may act as a limit in pursuing the correlation at a high level.

Since various variables in generating the N lenses 20 in the cavities corresponding thereto may act slightly differently between first cavities (e.g., $C_1, C_2, \ldots,$ and $C_M$) of the first cavity group 11-1, optical parameters or physical parameters of the M first lenses generated in the M first cavities $C_1, C_2, \ldots,$ and $C_M$ may be slightly different from each other.

Referring back to FIG. 1A, optical parameters or physical parameters of M lenses respectively generated in M cavities of remaining cavity groups (e.g., 11-2, 11-3, ..., and 11-N) other than the first cavity group 11-1, may also be slightly different from each other.

From a first difference between the M first lenses to an $N^{th}$ difference between M $n^{th}$ lenses, a secondary effect according to a combination thereof may be generated. A negative effect in which the secondary effect affects characteristics of the prepared lens module 40 may vary in a number the same as many as the number of cases of the secondary effect, and the number of cases of the secondary effect (e.g., MN) may be large. Lens module data 102 may include the secondary effect.

For example, the secondary effect may cause an overlapping phenomenon due to aberration and diffraction in the process of passing at least a portion of light through the prepared lens module, and a degree of overlap of light may be defined as a modulation transfer function (MTF). The MTF may be defined as a ratio between an overlapping modulation value of an object and an overlapping modulation value of an image surface of a lens module, and an ideal MTF may be 1. When the MTF is outside of a reference range, the prepared lens module may be determined to be defective.

In a computing system 100a performing a method for optimization of a lens module assembly, according to an embodiment, a cavity assembly condition 107 corresponding to information for selecting the N cavities may be efficiently provided, to reduce a secondary effect of a lens module 40 to be prepared before the N lenses 20 are assembled, or to reduce a defect rate of the lens module 40.

Depending on a design, the computing system 100a may reduce a secondary effect of a lens module 40 to be prepared, based on a rotation angle assembly condition 109 according to the cavity assembly condition 107 or a defect rate of the lens module 40. The rotation angle assembly condition 109 may include angle information on rotation of at least one of the N lenses in a direction around the optical axis, when the N lenses corresponding to the N cavities are assembled to overlap on the optical axis.

For example, isotropic properties of the generated N lenses 20 may be lower than isotropic properties of cavities corresponding thereto, due to various variables in the process of generating the N lenses 20 in the cavity, and roundness or flatness of the generated N lenses 20 may be further outside of 1. An effect in which an anisotropic element of the N lenses 20 affects a secondary effect may be determined, based on the rotation angle assembly condition 109.

For example, a recording medium 99 may be configured to access the computing system 100a to provide the computing system 100a with recorded information for performing a method for optimization of a lens module assembly by the computing system 100a.

Figure 2A:
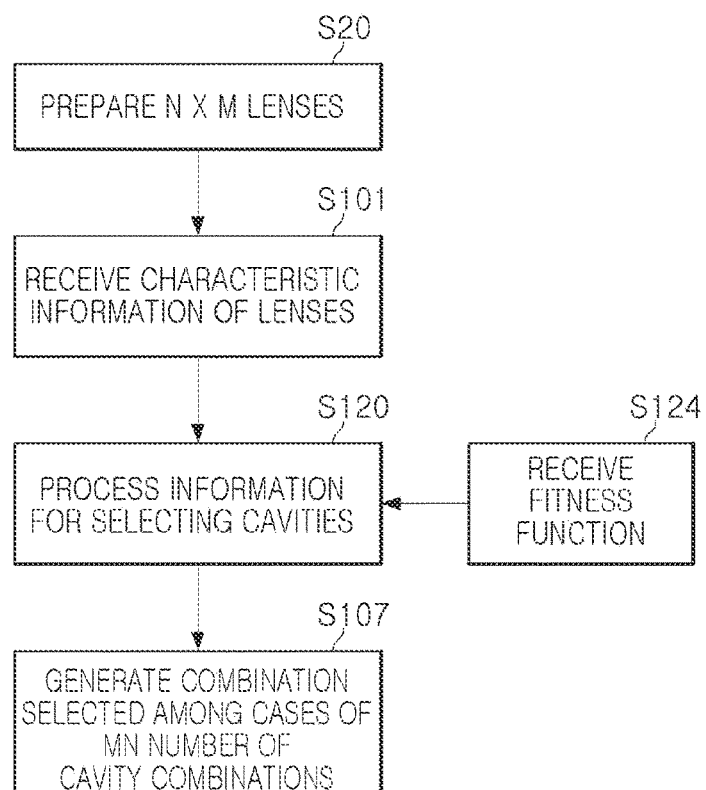
FIGS. 2A and 2B are flowcharts illustrating a method for optimization of a lens module assembly, according to an embodiments.
Figure 2B:
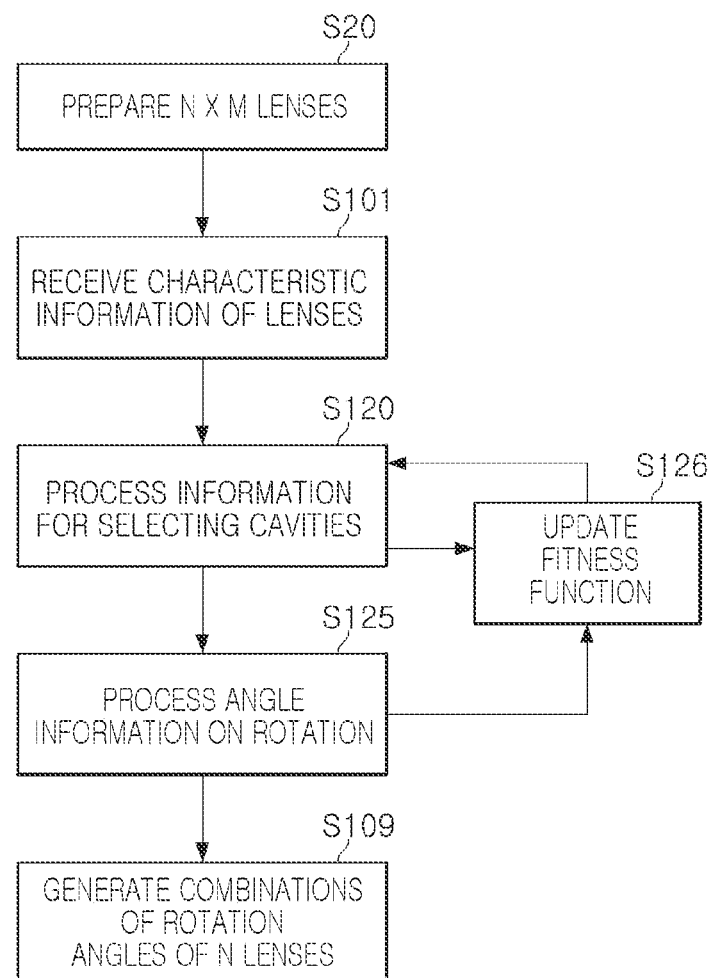

FIGS. 2A and 2B are flowcharts illustrating a method for optimization of a lens module assembly, according to embodiments.

Referring to FIG. 2A, a computing system for performing a method for optimization of a lens module assembly, according to an embodiment, may receive, in operation S101, in a state in which N×M lenses are formed in operation S20, characteristic information of at least N lenses respectively formed in N cavity groups each including a plurality of (e.g., M) cavities. The computing system may receive a fitness function in operation S124, may process information for selecting, by the computing system, N cavities from the N cavity groups, based on the characteristic information, in operation S120l, and may generate a combination selected from among cases of M N number of cavity combinations in operation S107.

The computing system may efficiently reduce or compress the number of cavity combinations based on a genetic algorithm, and may select cavity combinations according to characteristic information provided among the reduced number of cases of cavity combinations. Therefore, the number of trials and errors occurring in the process of assembling the lens module by a worker or an assembly process for assembling the lens module may be reduced.

Referring to FIG. 2B, in a method for optimization of a lens module assembly, according to an embodiment, a computing system for performing a method for optimization of a lens module assembly, according to an embodiment, may receive, in operation S101, in a state in which N×M lenses are formed in operation S20, characteristic information of at least N lenses respectively formed in N cavity groups including a plurality of (e.g., M) cavities, may process information for selecting, by the computing system, N cavities from the N cavity groups, based on a fitness function and the characteristic information, in operation S120l, may process angle information on rotation, in operation S125, and may perform updating of the fitness function, in operation S126.

In operation S126, the computing system may perform updating of the fitness function based on data of each of the N lenses corresponding to the N cavities selected by the processing of information in operation S120l, and may perform updating of the fitness function based on data of a lens module assembled at an angle corresponding to the processing of angle information in operation S125, according to a machine learning algorithm.

The information for selecting cavities and the angle information may have a time-series and mutually influencing relationship, and the machine learning algorithms may be efficient in processing data having a time-series and mutually influencing relationship. Thus, the fitness function may be updated efficiently, and the computing system may make a great contribution to efficiently selecting a cavity combination from among the number of cases of cavity combinations.

Figure 3:
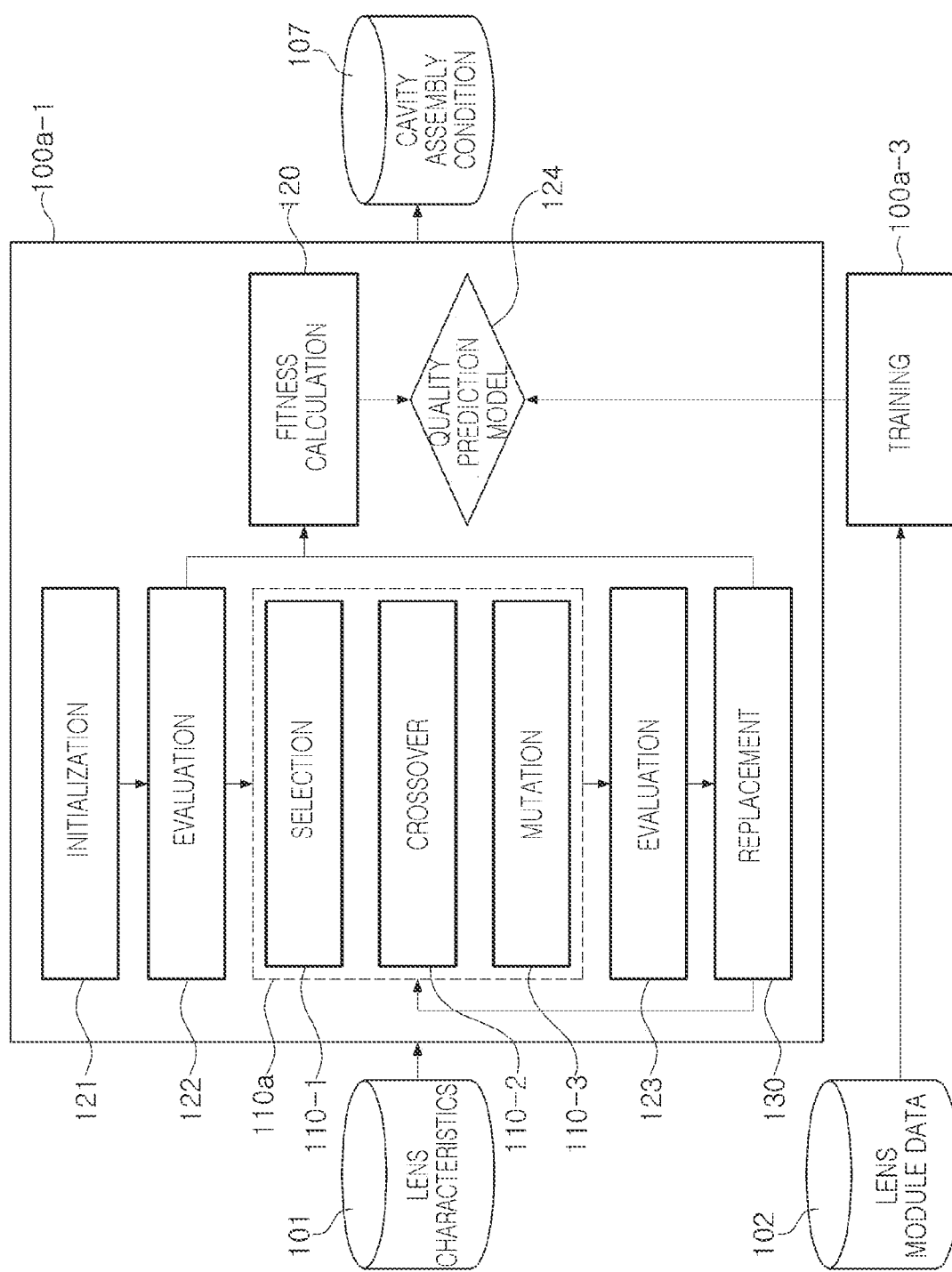
FIG. 3 is a block diagram illustrating a cavity selection structure in a method for optimization of a lens module assembly, according to an embodiment.
Figure 4:
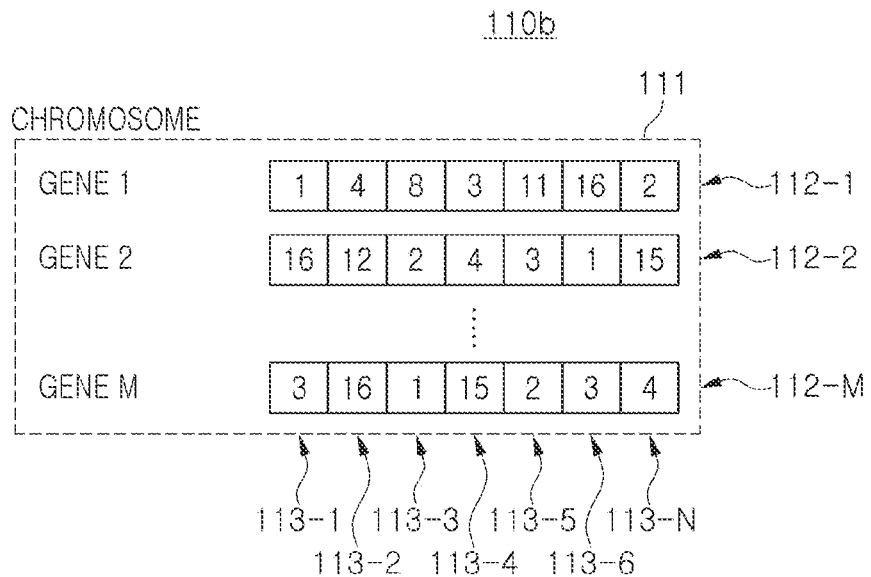
FIG. 4 is a view illustrating chromosome information of a genetic algorithm of a method for optimization of a lens module assembly, according to an embodiment.

FIG. 3 is a block diagram illustrating a cavity selection structure in a method for optimization of a lens module assembly, according to an embodiment. FIG. 4 is a view illustrating chromosome information of a genetic algorithm of a method for optimization of a lens module assembly, according to an embodiment.

Referring to FIG. 4, chromosome information 111 used in a genetic algorithm 110b may be composed of M or N pieces of gene information 112-1, 112-2, . . . , and 112-M respectively having N or M pieces of point information 113-1, 113-2, 113-3, 113-4, 113-5, 113-6, . . . , and 113-N.

For example, since a combination of N×M cavities corresponding to N×M lenses may be divided into M cavity combinations each including N cavities, one piece of chromosome information 111 may include M pieces of gene information 112-1, 112-2, . . . , and 112-M, and M lens modules may be prepared.

Referring to FIG. 3, a computing system 100a-1 for performing a method for optimization of a lens module assembly, according to an embodiment, may perform initialization to generate chromosome information respectively corresponding to M lens modules, in operation 121, may evaluate the generated chromosome information based on a fitness function 120, in operation 122, may select excellent gene information from among M pieces of gene information or excellent chromosome information from among a plurality of chromosome information, based on the evaluation result and a genetic algorithm 110a, in operation 110-1, may perform crossover of input chromosome information in operation 110-2 and/or mutation of input chromosome information in operation 110-3, based on a result of the selection, to generate output chromosome information, may evaluate the output chromosome information in operation 123, and may update chromosome entity information in operation 130, based on a result of the evaluation in operation 123. These processes may be repeated.

In other words, the computing system 100a-1 may update the chromosome entity information in operation 130, based on the fitness function and output chromosome information crossed or mutated based on the genetic algorithm 110a from input chromosome information corresponding to a past cavity selection result, and may generate a cavity assembly condition 107 including information for selecting N cavities, based on the chromosome entity information updated in operation 130 and lens characteristic information 101.

Therefore, the number of many cases of cavity combinations may be efficiently reduced or compressed based on a genetic algorithm.

For example, the updating of the chromosome entity information in operation 130 may be performed based on a number of values, greater than or equal to a reference value, among a plurality of values of a plurality of gene information included in the input chromosome information and/or the output chromosome information, according to a quality prediction model 124, and may be performed based on a number of values, greater than or equal to a reference value, among a plurality of values of M cavity selection results selected from N cavity groups, according to a quality prediction model 124.

Since the computing system 100a-1 may receive the lens characteristic information 101, correspondence relationship between the updating of the chromosome entity information in operation 130 and the lens characteristic information 101 may be determined, specific chromosome information may be selected from the chromosome entity information updated in operation 130, based on the lens characteristic information 101, and the selected chromosome information may correspond to information for selecting N cavities. For example, the lens characteristic information 101 may be optical or physical measurement information (e.g., a diameter, a thickness, a curvature, a roundness, a flatness, or the like) of N lens groups.

In operation 100a-3, the computing system 100a-1 may repeatedly train the quality prediction model 124 based on N lenses or lens module data 102 according to a past cavity selection result. The fitness function 120 may be updated repeatedly.

The fitness function may be calculated by Equation 1 below. In Equation 1, $c_i$ is $i^{th}$ chromosome information, and $n(\cdot)$ is a function for calculating the number of pieces of gene information determined as a good product, among chromosome information. For example, the genetic information may be determined as good or bad, based on the quality prediction model 124.

$$f=n(c_i) \quad \text{[Equation 1]}$$

In this case, to determine a gene as a good or bad product, a quality prediction model 124 that is previously-trained may be used, and the quality prediction model 124 may use a methodology suitable for a user's purpose. A regression model may be used to directly predict numerical values (e.g., MTF) of a lens module as a prediction model, and a quality classification methodology in the example below may be converted to the regression model as it is.

For example, a methodology capable of performing as the quality prediction model 124 may be as follows. The following methodology or the like may be applied as a general classification methodology.

A support vector machine (SVM) may be a model that finds a hyperplane performing the best classification, when being classified. The hyperplane refers to a point at which a margin (w), which may be a distance between a plus-plane and a minus-plane, is maximized, and the margin may be determined by a position of the hyperplane and a position of a support vector. The SVM may have an advantage of having no influence on outliers, but may have a disadvantage of taking a relatively long time to build the model and having low explanatory power of results therefrom.

A decision tree (DT) may be a classification model that divides independent variable spaces by sequentially applying various rules. The DT may have an advantage of low computational cost and high explanatory power of results therefrom.

A random forest (RF) may be an ensemble model that utilizes bootstrap aggregating or bagging to divide training and test data into multiple subsets. Bagging may be a basic technique of RF, and may have an effect of reducing variance of predicted values. Therefore, thousands of input variables may be handled with higher accuracy.

Bayes classifier may use a classification model that predicts a class well representing data by solving a probabilistic problem based on Bayesian probabilities. In general, the Bayes classifier may mainly use a Naive Bayes classification model that simplifies calculation by assuming conditional independence of respective class label, when calculating posterior probability. In addition, the Bayes classifier may be characterized by utilizing a very small amount of training data for estimating a parameter, and by being robust to outliers.

Furthermore, various methodologies exist for compensating for data imbalance problems that may occur, because good product data may be collected frequently due to their usage mainly in manufacturing sites. However, defective product data may be barely collected, and there may be examples such as methodologies below.

Balanced bagging classifier may be one of the ensembles specialized for class unbalanced data, and may predict and aggregate random subsets obtained from a given data set with a basic classifier.

RUSBoost classifier and SMOTEBoost classifier may be unbalanced data classification models that hybridize a boosting concept and undersampling and oversampling techniques, respectively, and may remove data variance imbalances and improve performance of poorly performing classifiers.

A deep neural network (DNN) based on a mean false error (MFE) may implement a method of using a proposed MFE or a mean squared false error (MSFE), focusing on the data imbalance problem, as a loss function, in a general DNN methodology. In general, a mean squared error (MSE) may be widely used as a loss function, which may represent an average of error values for all instances and may be considered to be equal, regardless of class. However, MFE may calculate an average of error values in consideration of the total number of instances per class. For this, in Equation 2, a mean false error, a false positive error, and a false negative error may be represented, respectively.

$$MFE = FPE + FNE \quad \text{[Equation 2]}$$

$$FPE = \frac{1}{N_n} \times \sum_{n=1}^{N_n} (y_n - \hat{y}_n)^2$$

$$FNE = \frac{1}{N_p} \times \sum_{n=1}^{N_p} (y_n - \hat{y}_n)^2$$

Figure 5:
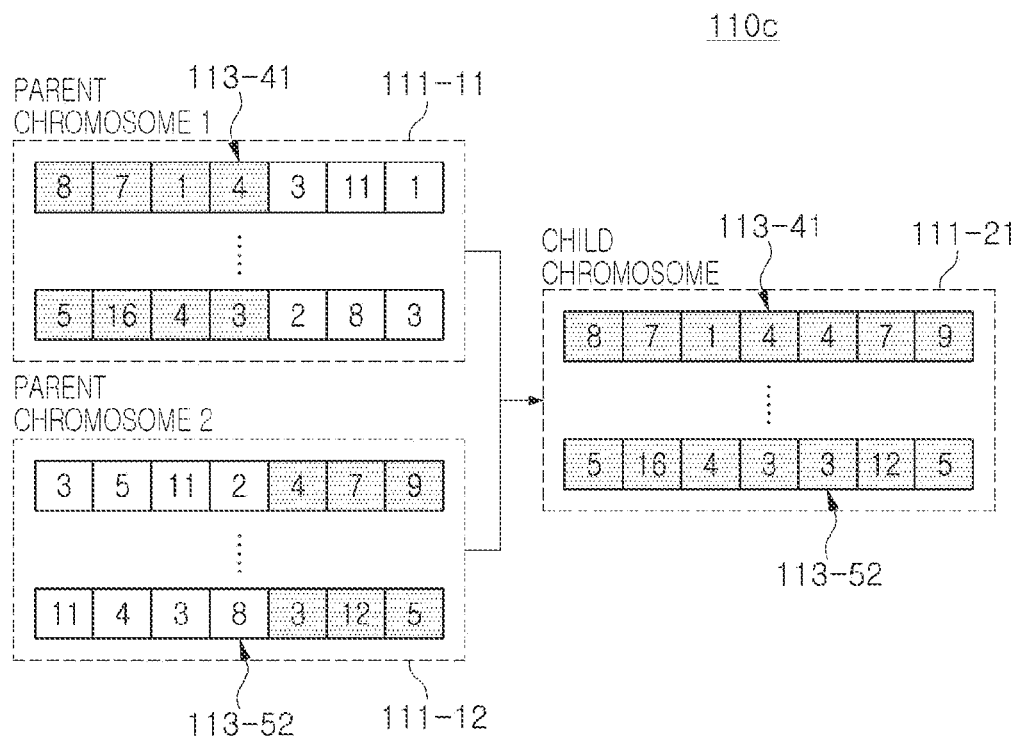
FIGS. 5 and 6 are views illustrating chromosome crossing of a genetic algorithm of a method for optimization of a lens module assembly, according to embodiments.
Figure 6:
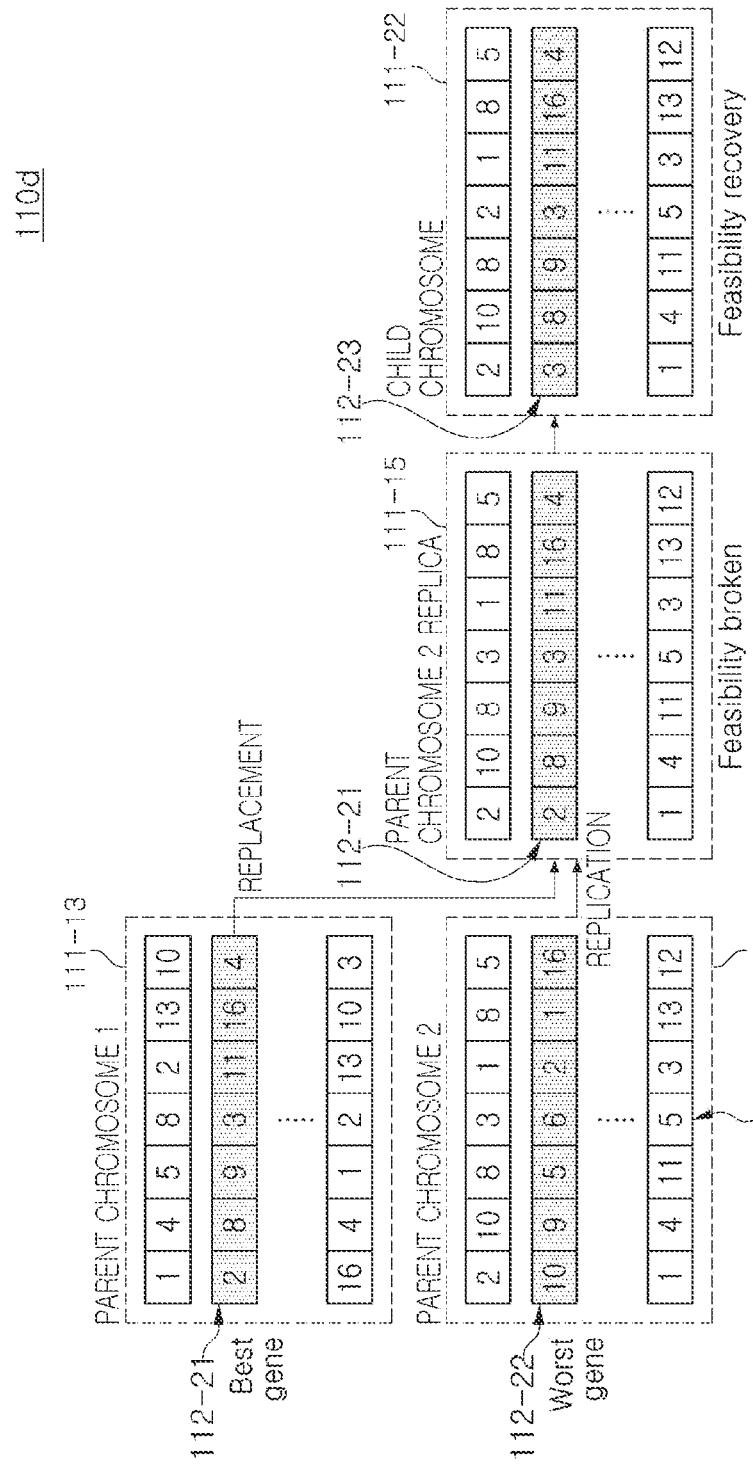

FIGS. 5 and 6 are views illustrating chromosome crossing of a genetic algorithm of a method for optimization of a lens module assembly, according to embodiments.

Referring to FIG. 5, a plurality of pieces of input chromosome information 111-11 and 111-12 used in a genetic algorithm 110c may correspond to a parent chromosome, and output chromosome information 111-21 may correspond to a child chromosome.

The output chromosome information 111-21 may be generated between the plurality of pieces of input chromosome information 111-11 and 111-12 by a point crossover.

For example, first to fourth point information 113-41 of first input chromosome information 111-11 may be identical to first to fourth point information 113-41 of output chromosome information 111-21, and fifth to seventh point information 113-52 of second input chromosome information 111-12 may be identical to fifth to seventh point information 113-52 of the output chromosome information 111-21. Positions of points to be crossed may be determined at random.

Referring to FIG. 6, a plurality of pieces of input chromosome information 111-13 and 111-14 used in a genetic algorithm 110d may correspond to a parent chromosome, and output chromosome information 111-22 may correspond to a child chromosome.

The output chromosome information 111-22 may be generated between the plurality of pieces of input chromosome information 111-13 and 111-14 by a gene crossover.

For example, among M pieces of gene information of second input chromosome information 111-14, second gene information 112-22 may be gene information having the highest probability of poor product prediction according to a quality prediction model, or the lowest gene information having a value (e.g., MTF) of a lens module equal to and less than a reference value, predicted by a regression model, and may correspond to a recessive gene. Among M pieces of gene information of first input chromosome information 111-13, second gene information 112-21 may be gene information having the highest probability of good product prediction according to a quality prediction model, or the highest gene information having a value (e.g., MTF) of a lens module equal to and greater than a reference value, predicted by a regression model, and may correspond to a dominant gene. The second gene information 112-22 of the second input chromosome information 111-14 may be replaced with the second gene information 112-21 of the first input chromosome information 111-13 in a replica 111-15 of the second input chromosome information.

Also, specific point information of second gene information 112-23 of the output chromosome information 111-22 may be mutated. Positions of points to be mutated may be determined at random.

Figure 7:
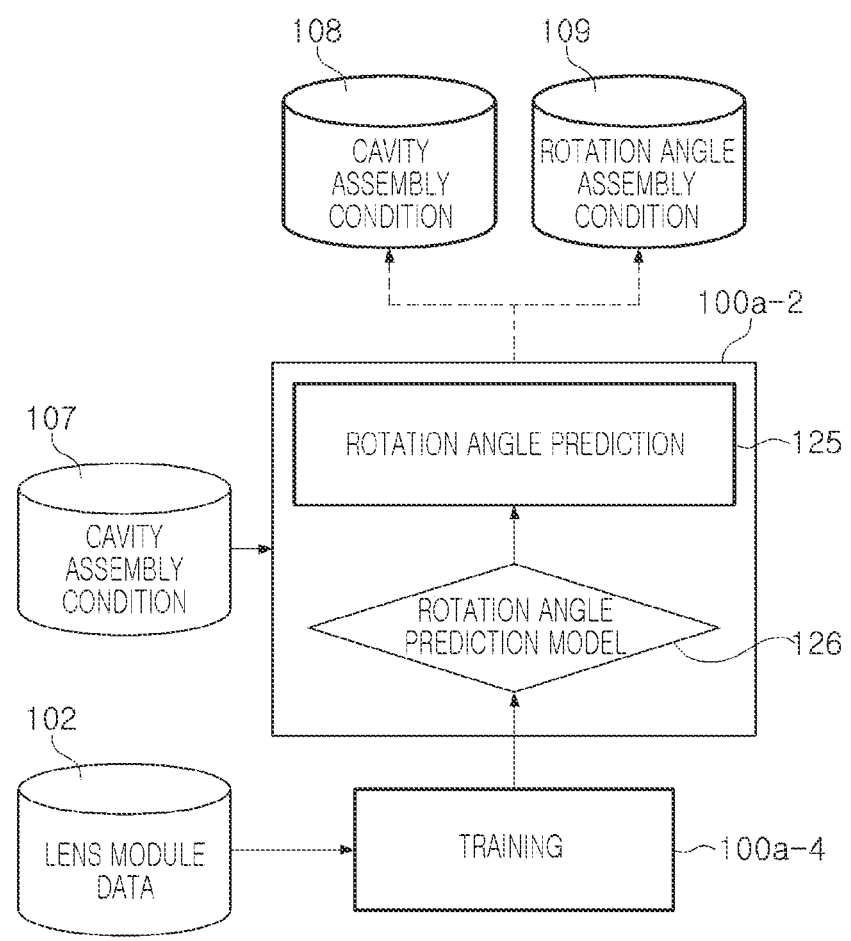
FIG. 7 is a block diagram illustrating a rotation angle prediction structure in a method for optimization of a lens module assembly, when assembling a lens, according to an embodiment.

FIG. 7 is a block diagram illustrating a rotation angle prediction structure in a method for optimization of a lens module assembly, when assembling a lens, according to an embodiment.

Referring to FIG. 7, a computing system 100a-2 performing a method for optimization of a lens module assembly, according to an embodiment, may predict a rotation angle assembly condition in operation 125, based on a cavity assembly condition 107 including information for selecting a cavity and a rotation angle prediction model 126, may generate a rotation angle assembly condition 109, and may generate a cavity assembly condition 108 in which a variable of the rotation angle assembly condition 109 is further reflected.

Lens module data 102 according to angle information corresponding to the rotation angle assembly condition 109 and the cavity assembly condition 108 in which a variable of the rotation angle assembly condition 109 is further reflected may be used in training 100a-4 of a model. A training target of the training 100a-4 of a model may be the rotation angle prediction model 126 and may be the quality prediction model and/or the fitness function, illustrated in FIG. 3.

For example, the quality prediction model and/or the fitness function may be updated based on data (e.g., characteristic information) of each of the N lenses corresponding to the N cavities, as illustrated in FIG. 3, and may be updated based on the lens module data 102 of the prepared lens module according to angle information corresponding to the rotation angle assembly condition 109 and the cavity assembly condition 108 in which a variable of the rotation angle assembly condition 109 is further reflected. The rotation angle prediction model 126 may be performed according to an efficient machine learning algorithm (e.g., RNN) for processing data having a relationship that is time series and affects each other. For example, the rotation angle prediction model 126 may receive characteristic information of N lenses, and may generate N angle information.

The rotation angle prediction model 126 may be configured to train such that lens module production data is input into a prediction model, and N rotation angle combinations corresponding to each dataset are predicted, to converge a difference between the N rotation angle combinations and actual N rotation angle combinations to zero.

For example, methodologies possible with the machine learning algorithm and the rotation angle prediction model 126 may be as follows.

Long short term memory (LSTM) (Hochreiter and Schmidhuber, 1997) may be one of recurrent neural network (RNN)-based methodologies that may be well known for exhibiting excellent performance in processing time series data, and may be used for prediction by separating past data as information to be forgotten and information to be remembered, and putting more weight on the information to be remembered.

In the RNN structure, a cell state has been added, in addition to a hidden layer, and three newly added gates may be used to obtain a hidden state value and a cell state value.

The three added gates may be (1) a forget gate, (2) an input gate, and (3) an output gate, respectively, and the activation function expression for each gate may be illustrated in Equations 3 to 5.

$$f_t = \sigma(W^{(f)}x_t + U^{(f)}h_{t-1}) \quad \text{[Equation 3]}$$

$$i_t = \sigma(W^{(i)}x_t + U^{(i)}h_{t-1}) \quad \text{[Equation 4]}$$

$$O_t = \sigma(W^{(o)}x_t + U^{(o)}h_{t-1}) \quad \text{[Equation 5]}$$

The forget gate may be used to control hidden layer nodes in which past information is stored. $f_t$ may be calculated as a value of 0 or 1. When $f_t$ is 0, the past information may be not removed and used, and when $f_t$ is 1, the past information may be kept.

The input gate may be used to determine what information needs to be maintained in order to update a current cell state.

Like $f_t$, $i_t$ may be also calculated as a value of 0 or 1. When $i_t$ is 0, the past information may be maintained as it is, and when $i_t$ is 1, the past information may be updated using inherent information in a current cell state.

Finally, the output gate may be used to determine what information to display as an output. $o_t$ may be also calculated as a value of 0 or 1. When $o_t$ is 0, the information may be not displayed, and When $o_t$ is 1, the information may be displayed.

A convolutional long short term memory (C-LSTM) (Shi et al., 2017) may be a methodology that combines a deep convolutional neural network (DCNN) (Krizhevsky et al., 2012) and a bidirectional LSTM (Graves et al., 2009).

The DCNN may be a methodology known to effectively capture inherent characteristics in data, and may extract inherent characteristic vectors in input data through a convolutional layer.

Thereafter, output value may be predicted by reflecting sequential characteristics based on the unidirectional LSTM or the bidirectional LSTM, introduced above.

A gated recurrent unit (GRU) (Cho et al., 2014), like LSTM, may be one of representative cell types of recurrent neural networks.

There may be a cell structure having low calculation complexity while maintaining the advantages of LSTM, and there may be only two gates, an update gate and a reset gate.

The gates may reflect an input value $x_t$ at a current time point and a hidden state value $h_{t-1}$ at a previous time point.

Equations 6 and 7 below illustrate calculations of the update gate and the reset gate in sequence.

$$Z_t = \sigma(W^{(z)}x_t + U^{(z)}h_{t-1}) \quad \text{[Equation 6]}$$

$$r_t = \sigma(W^{(r)}x_t + U^{(r)}h_{t-1}) \quad \text{[Equation 7]}$$

Equation 8 may represent information to be memorized at a current time point (t), and may reflect current time information ($Wx_t$) and previous information ($Uh_{t-1}$), but may refer to how much past information is reflected, depending on a reset gate value.

$$\tilde{h}_t = \tanh(Wx_t + r_t \odot Uh_{t-1}) \quad \text{[Equation 8]}$$

In addition, the methodologies may be developed by the following mechanism.

Attention mechanism (Bandanau et al., 2014) has been proposed to compensate for the disadvantage of always representing a vector having the same length, regardless of a length of an existing input data, in the RNN-based seq2seq model.

In the mechanism, from input data, a vector related to the target data to be predicted may be selected to generate a subset, and may be used for predicting target data.

The mechanism may be a method of using input data having an influence on target data to be predicted at time with high attention while referencing entire input data once again at every time-step of outputting the target data by this method.

Figure 8:
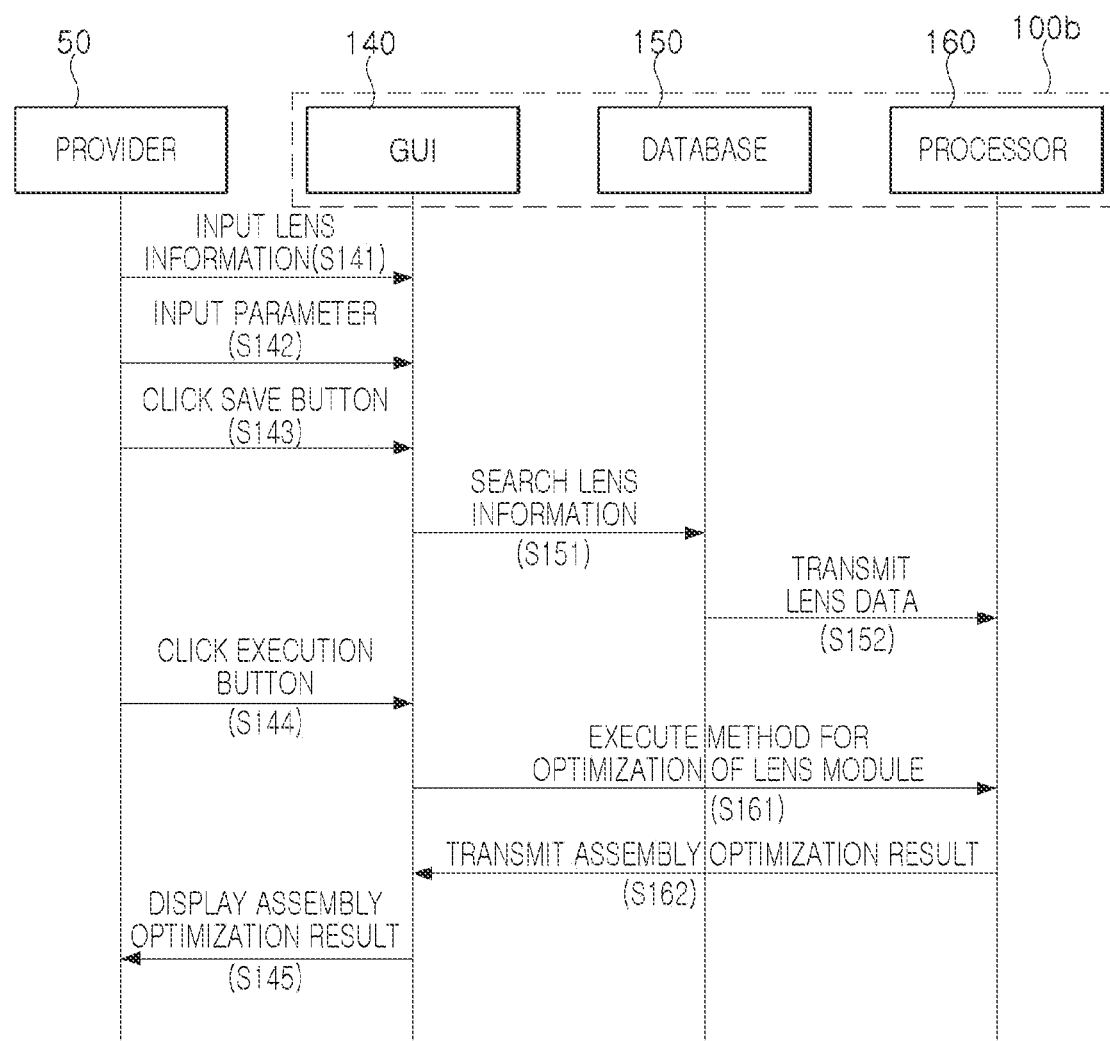
FIG. 8 is a view illustrating an interaction between a method for optimization of a lens module assembly, according to an embodiment, and a provider.

FIG. 8 is a view illustrating an interaction between a method for optimization of a lens module assembly, according to an embodiment, and a provider.

Referring to FIG. 8, a computing system 100b performing a method for optimization of a lens module assembly, according to an embodiment, may include a graphic user interface (GUI) 140, a database 150, and a processor 160.

For example, the computing system 100b may include personal computers, server computers, handheld or laptop devices, mobile devices (e.g., mobile phones, PDAs, media players, or the like), multiprocessor systems, consumer electronics, mini computers, mainframe computers, distributed computing environments including any of the aforementioned systems or devices, or the like, but is not limited thereto. For example, the computing system 100b may further include a communication connection such as a modem, a network interface card (NIC), an integrated network interface, a radio frequency transmitter/receiver, an infrared port, a USB connection, or the like.

A provider 50 may be a worker preparing a lens module or a process/function of preparing a lens module. The provider 50 may input lens information (e.g., the number of lenses, design information, or the like) to the graphic user interface 140 in operation S141, may input a parameter (e.g., lens characteristic information, actual measurement information, or the like) to the graphic user interface 140 in operation S142, may click a save button in operation S143, may click an execution button in operation S144, and may check an assembly optimization result displayed in operation S145.

The graphic user interface 140 may provide an environment for interaction between the provider 50 and the computing system 100b, may search for lens information from the database 150 in operation S151, and may receive an assembly optimization result in operation S162.

The database 150 may store information regarding a fitness function, information regarding a genetic algorithm, and information regarding a machine learning algorithm, and may transmit lens data to the processor 160 in operation S152. For example, the database 150 may be implemented as a volatile memory (e.g., RAM, or the like), a non-volatile memory (e.g., ROM, flash memory, or the like), or a combination thereof, and may also be implemented with an additional storage such as a magnetic storage, an optic storage, or the like.

The processor 160 may process information regarding a fitness function, information regarding a genetic algorithm, and information regarding a machine learning algorithm. For example, the processor 160 may include a central processing unit (CPU), a graphic processing unit (GPU), a microprocessor, an application specific integrated circuit (ASIC), a field programmable gate array (FPGA), or the like, and may have a plurality of cores.

Figure 9:
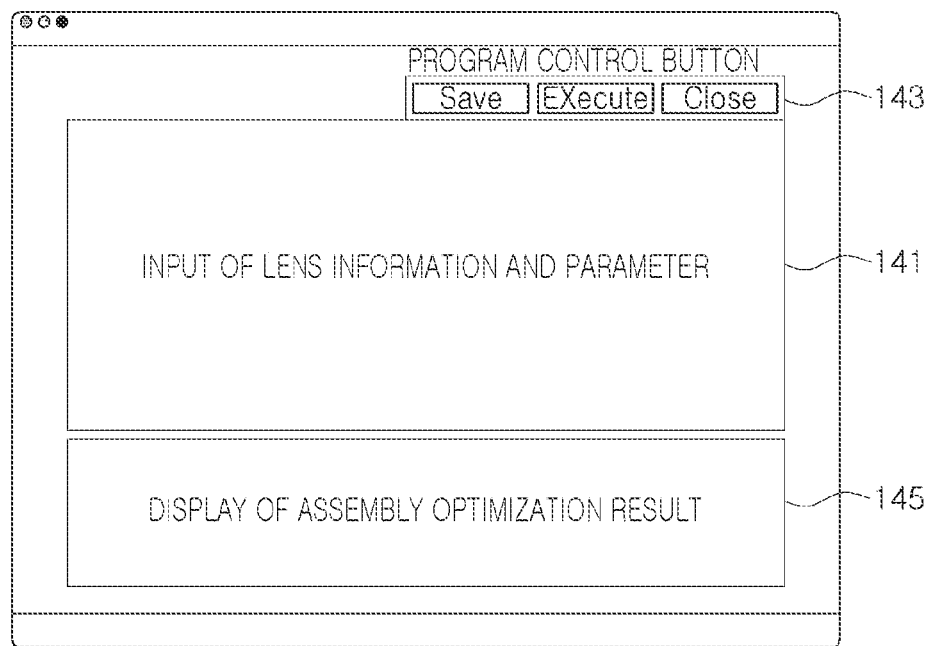
FIG. 9 is a view illustrating a graphic user interface (GUI) of FIG. 8, according to an embodiment.

FIG. 9 is a view illustrating the graphic user interface (GUI) 140 of FIG. 8.

Referring to FIG. 9, the graphic user interface 140 may include a region 141 in which lens information and parameters are input, a region 143 having a program operation button, and a region 145 displaying an assembly optimization result.

For example, the graphic user interface 140 may include input devices (e.g., a keyboard, a mouse, a pen, a voice input device, a touch input device, an infrared camera, a video input device, or the like) and output devices (e.g., a display, a speaker, a printer, or the like).

According to method for optimization of a lens module assembly disclosed herein, a trial and error in a lens module assembly process by a worker assembling a lens module may be reduced, and mass production of the lens module may be efficiently improved.

The recording medium 99, the computing systems 100*a*, 100*a*-1, 100*a*-2, and 100*b*, the provider 50, the GUI 140, the database 150, the processor 160, the processors, the memories, and other apparatuses, devices, units, modules, and components described herein with respect to FIGS. 1-9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with optimization of a lens module assembly, comprising:
   in preparing a lens module including assembled N lenses respectively formed in cavities to overlap each other on an optical axis, wherein N is a natural number of 2 or more:
   receiving, by a computing system, characteristic information of at least N lenses respectively formed in N cavity groups each including a respective plurality of cavities having a similarity to each other that is higher than a similarity to each other of the assembled N lenses; and
   processing, by the computing system, information for selecting N cavities from the N cavity groups, based on the characteristic information,
   wherein the processing of the information for selecting the N cavities includes updating chromosome entity information based on output chromosome information crossed or mutated based on a genetic algorithm from input chromosome information obtained by the processing of the information for selecting the N cavities, and processing the information for selecting the N cavities based on the chromosome entity information and the characteristic information.

2. The method of claim 1, wherein chromosome information used in the genetic algorithm is composed of a plurality of gene information respectively having N pieces of point information, or the chromosome information used in the genetic algorithm is composed of N pieces of gene information respectively having a plurality of point information.

3. The method of claim 2, wherein the output chromosome information is generated through either one or both of a point crossover and a gene crossover between a plurality of input chromosome information.

4. The method of claim 2, wherein the updating of the chromosome entity information is performed based on a number of values, greater than or equal to a reference value, among a plurality of values according to a quality prediction model of a plurality of gene information included in the input chromosome information or the output chromosome information.

5. The method of claim 1, wherein each of the N cavity groups includes M cavities, wherein M is a natural number of 2 or more, and
   wherein the updating of the chromosome entity information is performed based on a number of values, greater than or equal to a reference value, among a plurality of values according to a quality prediction model of an M cavity selection result selected from the N cavity groups.

6. The method of claim 1, wherein a plurality of lenses corresponding to the plurality of cavities included in one of the N cavity groups are formed at the same time, and
   wherein the characteristic information of the N lens groups includes optical or physical measurement information of the N lens groups.

7. The method of claim 1, wherein the computing system receives or stores a past cavity selection result obtained by the processing of the information for selecting the N cavities, the fitness function configured based on data of the assembled N lenses or data of the prepared lens module according to the past cavity selection result, and the genetic algorithm, and
   wherein the fitness function is repeatedly updated based on data of the assembled N lenses or data of the prepared lens module according to the past cavity selection result.

8. The method of claim 7, further comprising processing, by the computing system, angle information on rotation of at least one of N lenses corresponding to the N cavities in a direction around the optical axis, when the N lenses corresponding to the N cavities are assembled to overlap on the optical axis, based on the information for selecting the N cavities.

9. The method of claim 8, further comprising performing updating of the fitness function based on data of each of the N lenses corresponding to the N cavities selected by the processing of the information for selecting the N cavities, and updating of the fitness function based on data of a lens module assembled at an angle corresponding to the processing of the angle information, according to a machine learning algorithm.

10. A non-transitory, computer-readable storage medium storing instructions that, when executed by a processor, cause the processor to perform the method of claim 1.

11. A method with optimization of a lens module assembly, comprising:
    in preparing a lens module including assembled N lenses respectively formed in cavities to overlap each other on an optical axis, wherein N is a natural number of 2 or more:
    receiving, by a computing system, characteristic information of at least N lenses respectively formed in N cavity groups each including a respective plurality of cavities having a similarity to each other that is higher than a similarity to each other of the assembled N lenses;
    processing, by the computing system, information for selecting N cavities from the N cavity groups, based on a fitness function and the characteristic information; and
    processing, by the computing system, angle information on rotation of at least one of N lenses corresponding to the N cavities in a direction around the optical axis, when the N lenses corresponding to the N cavities are assembled to overlap on the optical axis, based on the information for selecting the N cavities,
    wherein the computing system receives or stores a past cavity selection result obtained by the processing of the information for selecting the N cavities, and the fitness function configured based on data of the assembled N lenses or data of the prepared lens module according to the past cavity selection result, and wherein the computing system performs updating of the fitness function based on at least one of data of each of the N lenses corresponding to the N cavities selected by the processing of the information for selecting the N cavities, and data of a lens module assembled at an angle corresponding to the processing of the angle information, according to a machine learning algorithm.

12. The method of claim 11, wherein the processing of the angle information comprises processing the angle information by applying the information for selecting the N cavities to a rotation angle prediction model updated based on the data of a lens module assembled at the angle corresponding to the processing of the angle information.

13. The method of claim 11, wherein each of the N cavity groups includes M cavities, wherein M is a natural number of 2 or more, and wherein fitness information output from the fitness function comprises information on a number of values, greater than or equal to a reference value, among a plurality of values according to a quality prediction model of an M cavity selection result selected from the N cavity groups.

14. The method of claim 11, wherein the plurality of cavities included in one of the N cavity groups have a higher isotropic property, respectively, than a plurality of lenses corresponding to the one of the N cavity groups, and wherein the plurality of cavities included in one of the N cavity groups are connected to each other before a plurality of lenses corresponding to the one of the N cavity groups are formed, and are separated from each other after the plurality of lenses corresponding to the one of the N cavity groups are formed.

15. A non-transitory, computer-readable storage medium storing instructions that when executed by a processor, cause the processor to perform the method of claim 11.

16. A system with optimization of a lens module assembly, comprising:

at least one processor configured to, in preparing a lens module including assembled N lenses respectively formed in cavities to overlap each other on an optical axis, wherein N is a natural number of 2 or more:

receive characteristic information of at least N lenses respectively formed in N cavity groups each including a plurality of cavities;

process information for selecting N cavities from the N cavity groups, based on a fitness function and the characteristic information; and process angle information on rotation of at least one of N lenses corresponding to the N cavities in a direction around the optical axis, when the N lenses corresponding to the N cavities are assembled to overlap on the optical axis, based on the information for selecting the N cavities, wherein the system is configured to obtain a past cavity selection result obtained by the processing of the information for selecting the N cavities, the fitness function configured based on data of the assembled N lenses or data of the prepared lens module according to the past cavity selection result, and wherein the at least one processor is further configured to perform updating of the fitness function based on at least one of data of each of the N lenses corresponding to the N cavities selected by the processing of the information for selecting the N cavities, and data of a lens module assembled at an angle corresponding to the processing of the angle information, according to a machine learning algorithm.

17. The system of claim 16, wherein the plurality of cavities have a similarity to each other that is higher than a similarity to each other of the assembled N lenses, and wherein, in each of the N cavity groups, a plurality of lenses are respectively formed in the plurality of cavities at the same time.

18. The system of claim 16, wherein the at least one processor is further configured to process the information for selecting the N cavities by updating chromosome entity information based on the fitness function and output chromosome information generated by a genetic algorithm from input chromosome information corresponding to the past cavity selection result, and processing the information for selecting the N cavities based on the chromosome entity information and the characteristic information.

19. The system of claim 18, wherein chromosome information used in the genetic algorithm is composed of a plurality of gene information respectively having N pieces of point information, or the chromosome information used in the genetic algorithm is composed of N pieces of gene information respectively having a plurality of point information, and wherein the output chromosome information is generated through either one or both of a point crossover and a gene crossover between a plurality of input chromosome information.

20. The system of claim 18, wherein each of the N cavity groups includes M cavities, wherein M is a natural number of 2 or more, and wherein the processor is further configured to perform the updating of the chromosome entity information based on a number of values, greater than or equal to a reference value, among a plurality of values according to a quality prediction model of an M cavity selection result selected from the N cavity groups.

* * * * *